United States Patent
Felsman

(10) Patent No.: US 6,950,952 B2
(45) Date of Patent: Sep. 27, 2005

(54) DYNAMIC POWER LEVEL CONTROL BASED ON A BOARD LATCH STATE

(75) Inventor: Gary S. Felsman, Arroyo Grande, CA (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/211,465

(22) Filed: Aug. 1, 2002

(65) Prior Publication Data

US 2004/0025064 A1 Feb. 5, 2004

(51) Int. Cl.$^7$ .............................................. G06F 13/14
(52) U.S. Cl. ..................... 713/310; 713/300; 713/320; 361/754; 361/759
(58) Field of Search ............................. 713/310, 300, 713/320; 361/754, 759

(56) References Cited

U.S. PATENT DOCUMENTS

| | | | | |
|---|---|---|---|---|
| 4,596,907 A | * | 6/1986 | LaGreco et al. | 200/50.01 |
| 5,410,714 A | * | 4/1995 | Yorimoto et al. | 713/323 |
| 5,727,168 A | * | 3/1998 | Inoue et al. | 710/301 |
| 5,734,618 A | * | 3/1998 | Mizuta | 365/229 |
| 6,308,285 B1 | * | 10/2001 | Bowers | 714/10 |
| 6,388,884 B1 | * | 5/2002 | Greco et al. | 361/754 |
| 6,496,915 B1 | * | 12/2002 | Halleck | 711/171 |
| 6,850,417 B2 | * | 2/2005 | Cooper et al. | 361/752 |

* cited by examiner

*Primary Examiner*—A. Elamin
(74) *Attorney, Agent, or Firm*—Blakely, Sokoloff, Taylor & Zafman

(57) ABSTRACT

A control circuit on a modular blade or card monitors an ejector switch. Upon detecting a latch event at the ejector switch, the control circuit signals the operating system with the appropriate power management instruction. For example, if the ejector switch on the modular blade acts as a power button, the controller will generate a power management signal in accordance with the desired power control protocol, such as ACPI.

26 Claims, 4 Drawing Sheets

DYNAMIC POWER LEVEL CONTROL BASED ON A BOARD LATCH STATE

TECHNICAL FIELD

The invention relates to modular computer equipment. More particularly, the invention relates to improving power management on a modular blade.

BACKGROUND

In the past, the computer industry has used proprietary server solutions that required custom components and could only be produced in low-volumes. To stay competitive, network equipment providers are developing solutions that employ modular servers and computer equipment. Thus, the industry is shifting away from custom, low-volume proprietary computer solutions towards standards-based, modular computer equipment, such as blade-based servers. Standards-based modular servers and computer equipment allow network equipment providers to deliver high-availability network solutions on shorter development cycles and at lower costs. Exemplary modular computer applications include network servers, switches, telecom servers, broadband access servers, telecom switches, mobile base station controllers and storage devices.

As the industry moves towards standard blade-based systems, such as CompactPCI, a need to comply with energy conservation standards is also apparent. One such standard is the Advanced Configuration and Power Interface (ACPI) standard, which allows the operating system control of both the passive and active hardware power-savings components. One version of the ACPI standard is described in "Advanced Configuration and Power Interface Standard, Revision 2.0" published Jul. 27, 2000. For example, in the cooling systems, the ACPI standard controls passive cooling by reducing power to less active components and controls active cooling by turning the available device fans on or off. More importantly, ACPI defines standard interface mechanisms that allow an ACPI-compatible operating system to control and communicate with an ACPI-compatible hardware platform.

Unfortunately, configuring modular blade based hardware to conform to the ACPI standard is extremely difficult. Compliance with the ACPI power savings or sleep modes is particularly difficult for a modular component using CompactPCI, because there is no way to adjust power delivery to the blade. Regrettably, if the modular blades could control the power flow, the modular blade based hardware could obtain the largest absolute power savings through compliance with energy conservation standards, such as ACPI. The modular blade based hardware would realize this power savings, in part because the modular hardware tends to have the largest hardware configurations. Furthermore, automatic power management in modular blade based server hardware is an invaluable alternative to turning off individual power switches on each server when the hardware is not in use.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for power management based on ejector switch positioning are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
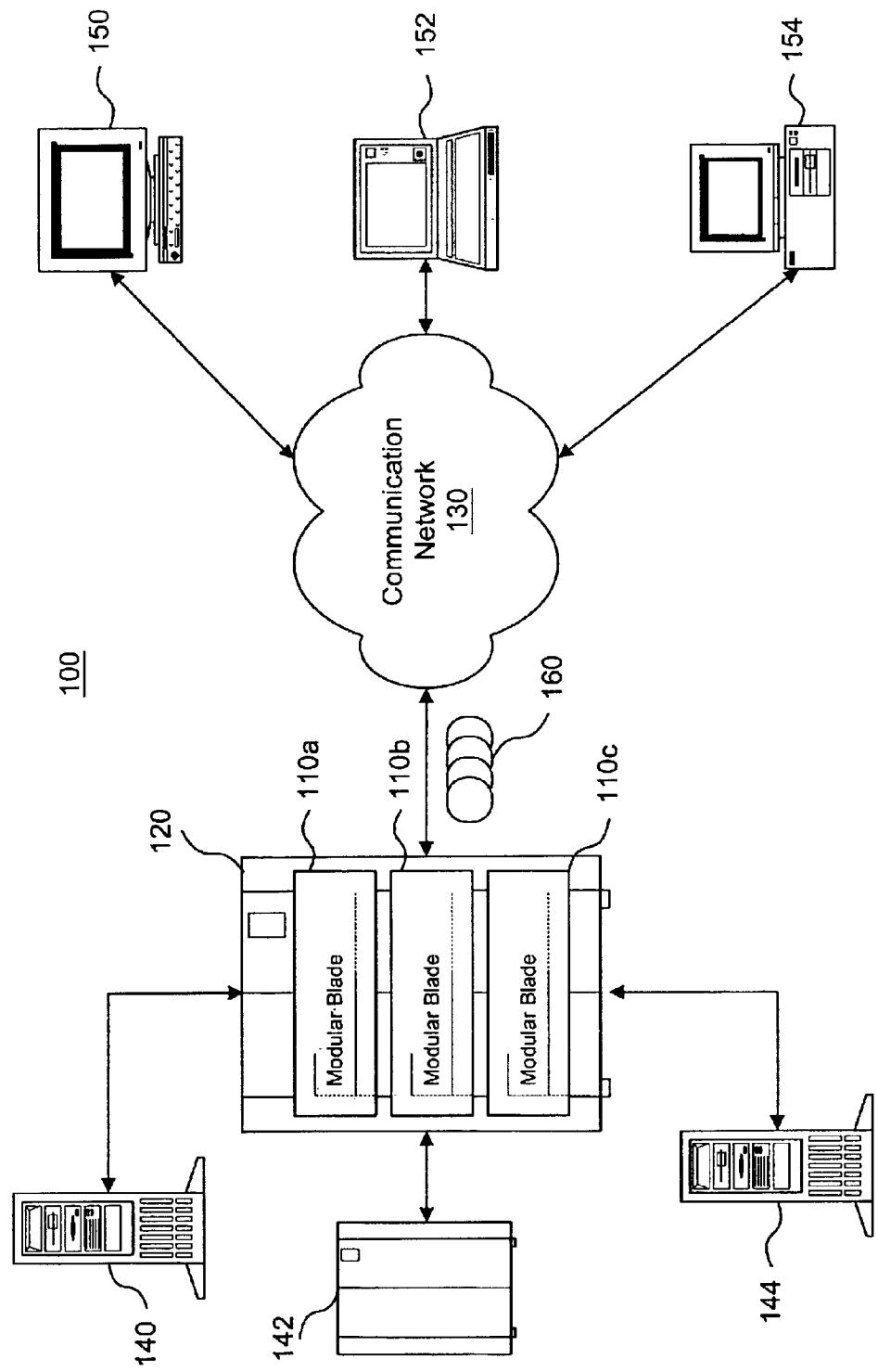
FIG. 1 illustrates one embodiment of a networking environment.

FIG. 1 illustrates one embodiment of a networking environment. The network device 120 distributes data 160 across a communication network 130 from source network devices 140–144 to destination network devices 150–154. The network device 120 controls the power consumption of the modular blades 110 via an operating system and power supply with various power states. Each modular blade 110*a*–110*c* can have a unique power state. Each power state can define certain operational characteristics for the blade according to available power consumption levels, acceptable restoration latency, desired system performance and/or response times.

The network device 120 is typically a modular passive backplane device, such as a server. Embodiments may also be practiced using different power management enabled network devices 120 including network switches, routers, hubs, multiprocessor systems, programmable or configurable consumer electronics, minicomputers, mainframe computers, personal computer systems and other systems that use modular components with at least one ejector switch. Power management as used herein refers to mechanisms in software and/or hardware to reduce power consumption, manage system performance and/or system thermal limits, and where appropriate increase system battery life. Typically, power management involves selecting performance trade-offs among system speed, restoration latency (length of time required to restore the device to fully operational day mode or "on" state), noise, battery life, processing speed, alternating current (AC) power consumption, and other system preferences.

Power management settings for the modular blades 110 in the network device 120 include, for example, a normal mode, a sleep mode, a soft off mode, and a mechanical off mode. In normal operation mode, modular blades 110 are maintained in a working state. The normal operation mode is used, for example, during operation when peak, or near peak performance may be required.

In sleep mode, power to components and operational speed is reduced as much as possible while maintaining the ability to wake and answer service requests coming in over the network, phone links, and so on, within specified latencies. So, for example, a print server blade 110*a* might go into sleep mode until it receives a print job, at which point it transitions to normal mode, prints the job, and then goes back to sleep mode. If the print request comes over the Communication Network 130 or LAN, then this scenario depends on an intelligent WAN/LAN adapter blade 110*b* that can wake the print server blade 110a in response to a received packet. Meanwhile the remaining modular blade 110c may remain in sleep mode, because it is not require to process the received request.

In soft off mode, toggling a power button, such as an ejector switch or latch, deactivates blade 110. Upon detecting a latch event, the power button mechanism sends a request or signal to the operating system controlling the modular blade 110. In one embodiment, what the operating system does with this request depends on policy issues derived from user preferences, user function requests, and/or application data. Typically, when the user has pressed the power button or unlatched the ejector switch, the operating system will put the blade into one of the sleep states. Generally, no user-visible computation occurs in a sleep state. The sleep sub-states differ in what events can arouse the system to a normal operation mode, and how long this takes.

When the machine must awaken to all possible events or do so very quickly, it can enter only the sub-states that achieve a partial reduction of system power consumption. However, if the only event of interest is a user pushing on a switch and a latency of minutes is allowed, the operating system could save all system context and transition the hardware into the deepest sleeping state. In this deepest sleeping state, the machine draws almost zero power and retains system context for an arbitrary period of time (years or decades if needed).

In mechanical off mode, the system transitions to a mechanical off state, where current flow to the blade 110 completely stops. The elimination of all current flow to the blade 110 is legally required in some jurisdictions (for example, in some European countries). In one embodiment the ejector switch applies the mechanical off mode when the blade 110 is removed from the slot in the network device 120.

Figure 2:
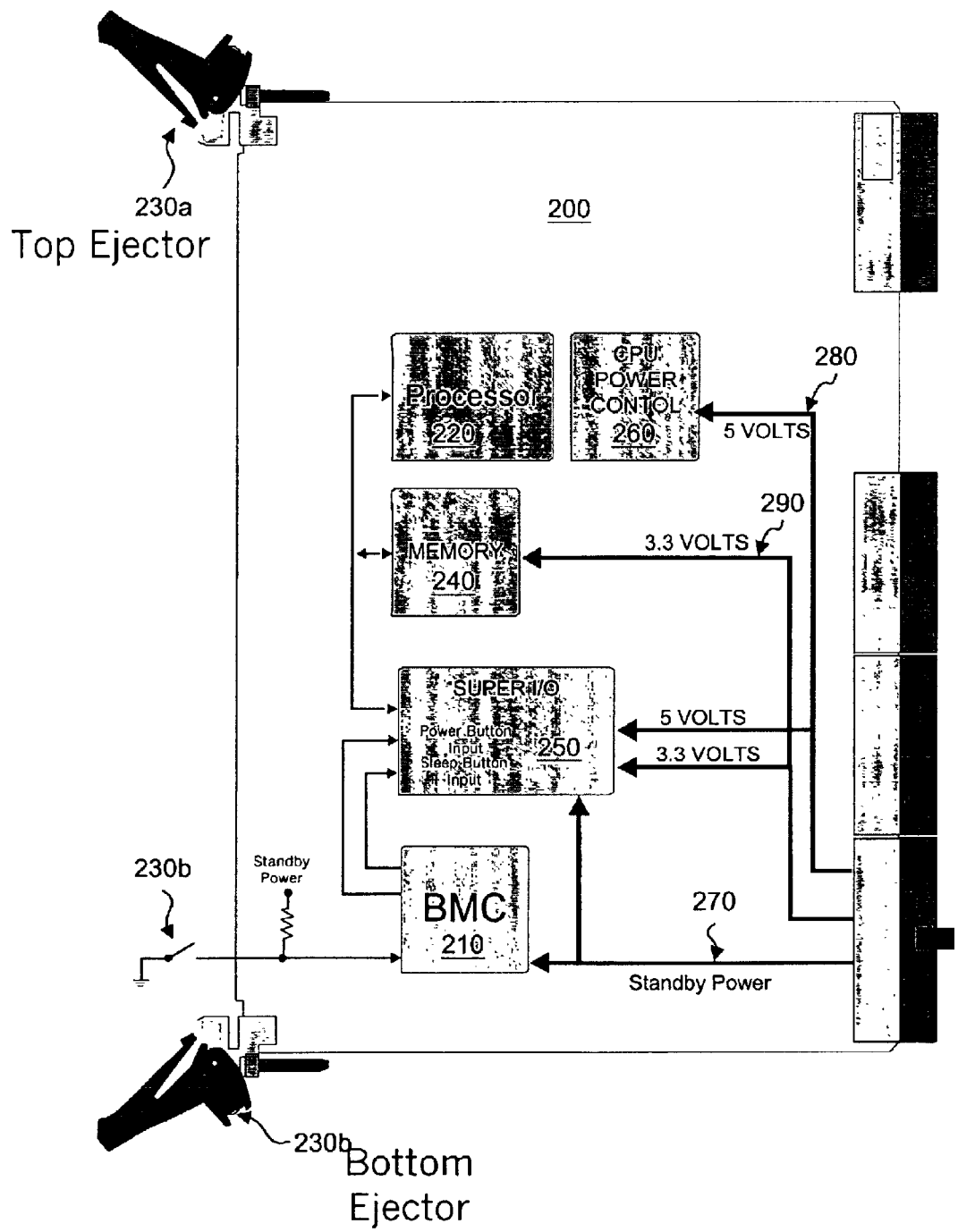
FIG. 2 is a block diagram of one embodiment of a baseboard management controller having an ejector switch to enable multiple power modes.

FIG. 2 is a block diagram of one embodiment of a baseboard management controller having an ejector switch to enable multiple power modes. In one embodiment the card for which power management is provided is a CompactPCI card; however, other types of cards can also be used.

CompactPCI is functionally a superset of desktop PCI; however, CompactPCI uses a different physical form factor. More specifically, CompactPCI utilizes standard Eurocard form factor dimensions, such as 3U (100 mm by 160 mm) and 6U (160 mm by 233 mm) card sizes. CompactPCI also uses high density 2 mm Pin-and-Socket connectors, vertical card orientation, positive card retention, user I/O connections on front or rear of module, staged power pins for hot swap capability, eight slots in basic configuration, but is easily expanded with bridge chips.

In one embodiment, card 200 uses a standby power source 270, in addition to the standard 5 Volt power source 280 and 3.3 Volt power source 290. Other voltages can also be provided. The BMC 210 monitors the ejector switches 230 and generates the necessary control signals thereby enabling the card 200 to meet ACPI compliance requirements.

In one embodiment, the BMC 210 generates and transmits signals indicating the state of the ejector switches to the processor 220 via the super I/O module 250. For example, power button and sleep button inputs are generated by logic and/or sensors that monitor the position of the ejector switches, and sent from the BMC 210 to the super I/O module 250. The processor 220 may reduce power to various components according to the type of request received from the ejector switch 230 via the BMC 210. For example, if an upper latch 230a is opened the processor 220 may place all nonessential components into a sleep mode, while opening the lower latch 230b is cuts power to these components (e.g., a mechanical off). Another embodiment, might allow one of the ejector switches 230 to behave as a mechanical power switch, while the other ejector switch behaves more like a sleep switch or soft power switch.

The super I/O module 250 receives the sleep button input from the BMC 210 so that the operating system may transition to a sleep state from the working state. If the super I/O module 250 receives the sleep button input while in a sleep state, the operating system will switch the system from the sleep or soft off state to the working state. In a similar fashion, the super I/O 250 also receives the power button input generated by the BMC 210. This transitions the system to or from a working state to a soft off or mechanical off state.

For each of the given working and sleep states the card 200 provides various power resources. Power resources allow the card 200 to operate in a given power state via the regulation of power used by the card 200 from the standby power 270, the standard 5 Volt power plane 280, and the 3.3 Volt power plane 290. Other voltage levels can be used in addition to and/or in place of 5 Volt power plane 280 and 3.3 Volt power plane 290.

Regulation may include reducing power delivered to the card 200, but may also utilize other energy conservation methodologies, such as proportional power reductions and selective component power reductions (e.g., power throttling). Exemplary power resources available to the card 200 include the aforementioned power planes (270–290) and the clock sources. The card 200 may also include other power sources, such as a battery or an alternating current (AC) line powered adapters or power supplies that supply power to the card 200.

The standby power 270 and BMC 210 enable the operating system operate in accordance with user preferences in implementing power conservation policy for the sleep and power buttons. For example, if the user desires the card 200 to "come on" less than 1 second after latching one of the ejector switches 230 to a working state with all context as it was when the user turned "off" the card, then the operating system must place the card in a sleep state that preserves the context prior to shutting down. This may be accomplished using the standby power 270. If response time is not as important as decreased power consumption a deeper sleep state may be used. If the context is not important, a mechanical off state may be used at shutdown. Other user preferences that may affect which sleeping state is selected include system alert functions, such as the system being used as an answering machine or fax machine, and application functions, such as saving a user file prior to shutdown.

While FIG. 2 illustrates one card 200, several other configurations are acceptable. For example, an embodiment using a latch monitor controller on a modular blade or card and an embodiment that employs an energy conservation compliant operating system would also benefit from employing the latch initiated power management architecture.

Once the latch monitor controller receives a signal from the latch, the controller may generate an appropriate power management signal to send to a processing unit on the modular blade. For example, if the ejector switch on the modular blade is configured to act as a power button, the controller will generate a power management signal in accordance with the desired power control protocol, such as ACPI. An ACPI compliant power button is associated with a signal that is several seconds in duration.

Figure 3:
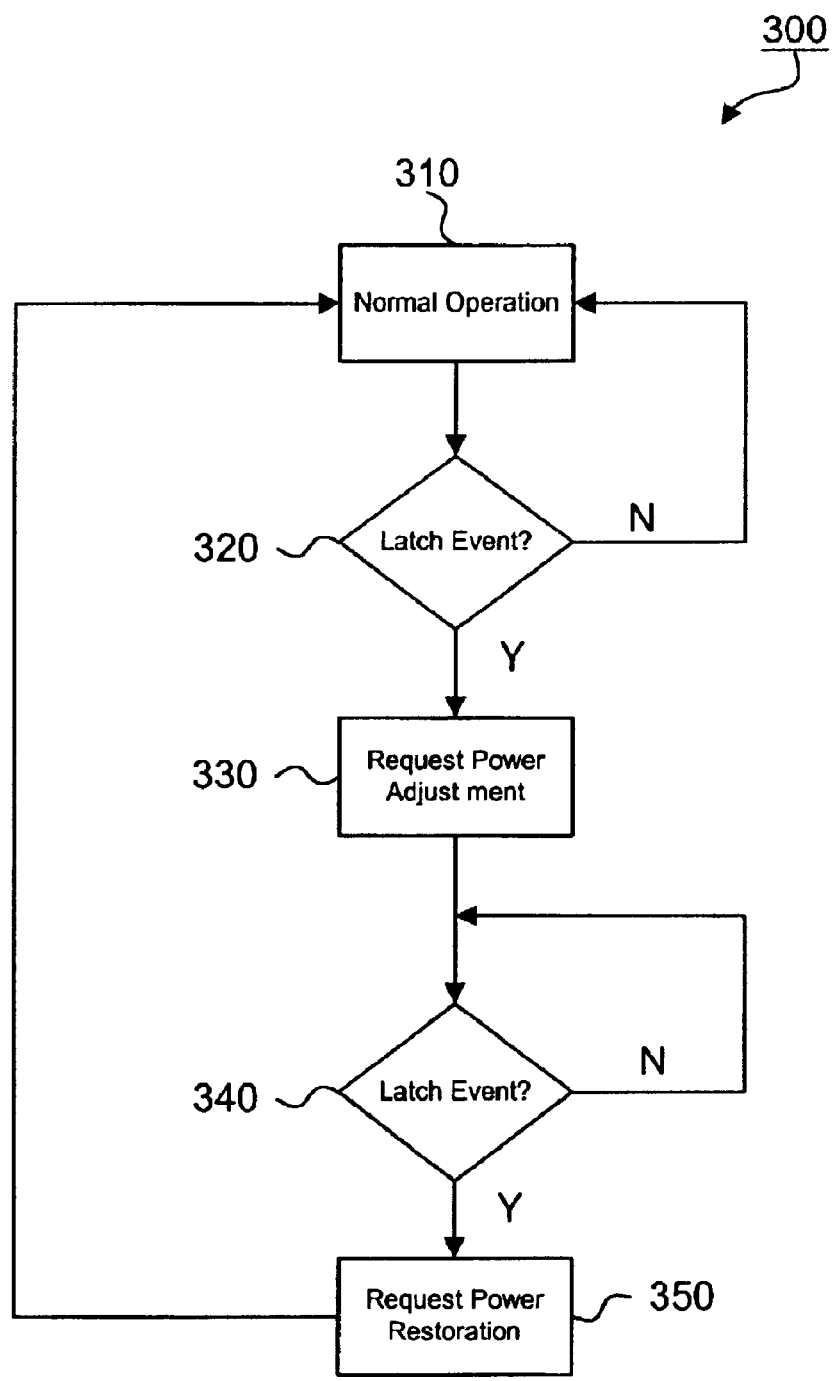
FIG. 3 is a flow diagram of one embodiment of power level modification based on ejector switch positioning.
Figure 4:
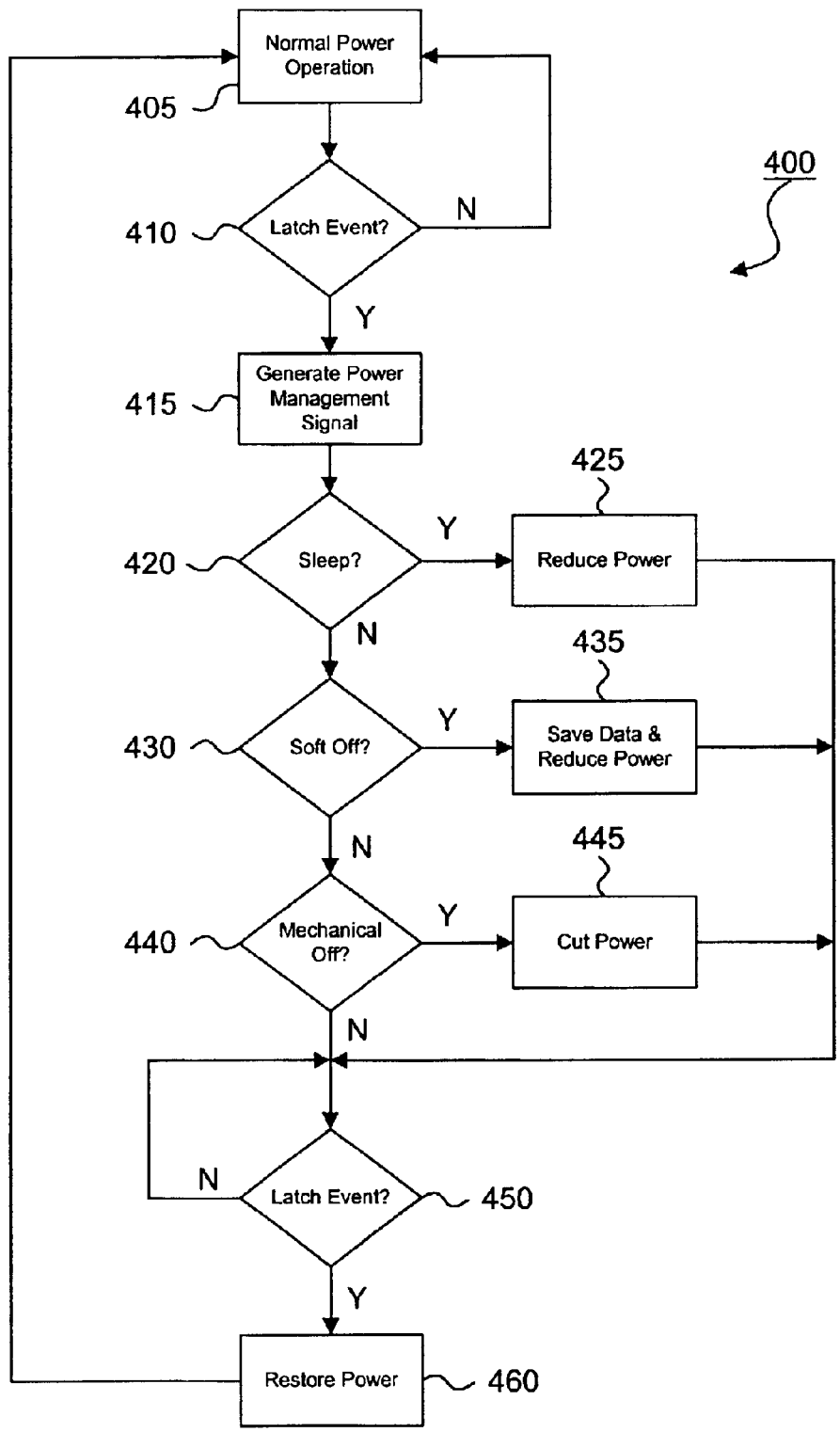
FIG. 4 is a flow diagram of one embodiment of a technique for power management based on ejector switch positioning.

Turning now to FIGS. 3 and 4, particular techniques are described in terms of computer software and hardware with reference to flowcharts. The techniques to be performed by a network device constitute digital logic and/or computer programs made up of computer-executable instructions.

Computer-executable instructions may be written in a computer programming language or may be embodied in firmware logic. If written in a programming language conforming to a recognized standard, such instructions can be executed on a variety of hardware platforms and for interface to a variety of operating systems. A variety of programming languages may be used to implement the techniques as described herein. Furthermore, it is common in the art to speak of software, in one form or another (e.g., program, procedure, process, application), as taking an action or causing a result. Such expressions are merely a shorthand way of saying that execution of the software by a network device causes a processor to perform an action or a produce a result.

FIG. 3 is a flow diagram of one embodiment of power level modification based on ejector switch positioning. The system 300 operates normally in block 310 until a latch event is detected in query block 320. Exemplary latch events include the toggling of the ejector switch from a closed to an open position, or from the open position to the closed position. Some ejector switches may be opened without ejecting the blade. In one embodiment, insertion of the blade into a system slot will close the ejector switch placing the blade into normal operation in block 310.

Upon detection of a latch event in query block 320, execution block 330 requests power adjustment. This request may, for example, take the form of an instruction or control signal sent to a processing unit or controller. Additional power management signals include sleep and mechanical off signals. Thus, the latch may be configured as a sleep button, a power button, or a mechanical power button.

Once the desired power adjustment is requested, query block 340 waits to detect a second latch event. Second latch events include closing/opening the ejector switch. Upon detection of the latch event, execution block 350 requests power restoration and the system 300 returns to normal operation in block 310.

The request for power restoration made by execution block 350 wakes the blade from a sleep state. Generally, this operation does not depend on the blade processor, because the processor is not be executing instructions in the sleeping power state. Instead, the operating system ensures that any bridge between the core logic and the blade components can still forward a wake signal. One device for accomplishing this task is through a baseboard management controller (BMC), one embodiment of which is described above.

FIG. 4 is a flow diagram of one embodiment of a technique for power management based on ejector switch positioning. The system 400 operates under normal power operation in block 405. In one embodiment, the normal power operation mode may also include sleep states not initiated by the sleep or power buttons. For example, a system 400 during normal operation may place individual components into a sleep state that achieves a partial reduction of system power consumption. In selecting which components to place into a sleep state, the system 400 may choose the components that are not essential to tasks presently being performed. Generally, these components are selected by the system 400 according to energy conservation criteria applied to various power related trade-offs, such as system performance, power consumption, noise, and response time. Other factors often considered when selecting component devices include device power consumption, device restoration latency, system preferences, application function requests, and other energy conservation conditions.

Upon detecting a latch even in query block 410, execution block 415 generates a power management signal. The type of signal generated depends on the latch event detected in query block 410. Power management signals can include, for example, sleep, soft off, and mechanical off. If query block 420 determines that the signal is a sleep signal, then execution block 425 reduces power and moves to a sleep state. If query block 430 detects a soft off signal, execution block 435 saves system data and reduces power to a designated sleep state. Finally if query block 440, detects a mechanical off signal, execution block 445 performs quick off activities prior to cutting power. Other and/or additional states can also be provided.

Once the system 400 is in a reduced power state, query block 450 monitors the latches for additional events. Upon detecting a latch event, such as closing an ejector switch, execution block 460 restores power so the system 400 can return to normal power operation in block 405. This restoration may occur through a wake signal generated by the monitoring components of the system 400. In alternate embodiments, other transitions can be provided, for example, from a mechanical off state to a sleep state.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
   a board having a power source and a control circuit coupled to control application of power from the power source to components on the board; and
   a first ejector switch electrically coupled to the control circuit to transmit a signal generated by the first ejector switch in response to a switch event, the signal to be used by the control circuit to control power management of the components of the board to signal an operating system to transition to a soft off state from the working state; and
   a second ejector switch electrically coupled to the control circuit to transmit a second signal generated by the second ejector switch in response to a switch event on the second switch, wherein a switch event on the second switch signals the control circuit to signal the operating system to transition to a sleeping state from the working state.

2. The apparatus of claim 1, wherein the first ejector switch has a first position configured to selectively lock the board into a slot and a second position that ejects the board from the slot.

3. The apparatus of claim 1, wherein the board comprises a CompactPCI board.

4. The apparatus of claim 1, wherein a switch event on the first ejector switch signals the control circuit to signal an operating system to transition to a sleeping state from a working state.

5. The apparatus of claim 4, wherein a second switch event on the first ejector switch signals the control circuit to signal the operating system to transition from a sleeping state to a working state.

6. The apparatus of claim 4, wherein the operating system is Advanced Configuration and Power Interface (ACPI) compliant.

7. The apparatus of claim 1, wherein a second switch event on the first ejector switch signals the control circuit to signal the operating system to transition from a soft off state to the working state.

8. The apparatus of claim 1, wherein a switch event on both the first and second switch signals the operating system to transition to a mechanical off state from a working state.

9. The apparatus of claim 1, wherein the switch event is toggling the ejector switch from a latched position to an unlatched position.

10. The apparatus of claim 9, wherein the signal indicates to the control circuit that the ejector switch is in an unlatched position.

11. The apparatus of claim 10, wherein the control circuit generates a sleep signal in response to the ejector switch signal.

12. The apparatus of claim 11, wherein the sleep signal reduces power to components on the board.

13. The apparatus of claim 10, wherein the control circuit generates a power down request in response to the ejector switch signal.

14. The apparatus of claim 13, wherein the power down request cuts power to at least one component on the board.

15. A system comprising:
a chassis having a plurality of slots configured to receive a blade;
a power source having a plurality of selectable power output levels; and
a blade selectively coupled to a slot and electrically coupled to the power source, the blade comprising a control circuit to request a power output level from the power source, and a first ejector switch electrically coupled to the control circuit, wherein the position of the first ejector switch is transmitted to the control circuit and used to determine a power level to be provided to one or more components of the blade and a second ejector switch electrically coupled to the control circuit to transmit a second signal generated by the second ejector switch in response to a switch event on the second switch, wherein a switch event on the second switch signals the control circuit to signal the operating system to transition a sleeping state from the working state.

16. The system in claim 15, wherein the blade comprises a CompactPCI-compliant blade.

17. The system in claim 15, the control circuit to request a sleeping state power output level when the ejector switch is in an unlatched position.

18. The system in claim 15, the control circuit to request a soft off power output level when the ejector switch is in an unlatched position.

19. The system in claim 15, the control circuit to request a mechanical off power output level when the ejector switch is in an eject position.

20. The system in claim 15, the control circuit to request a working state power output level when the ejector switch is in a latched position.

21. A method comprising:
detecting a change from a first state to a second state for a first latch on a board to be used in a modular system;
transitioning one or more components on the board from a working state to a reduce power state in response to the change to the second state for the first latch;
detecting a change from a first state to a second state for a second latch on the board; and
transitioning one or more components on the board from the reduced power state to a mechanical off state in response to the change to the second state for the second latch.

22. The method of claim 21 further comprising:
detecting a change from the second state to the first state for the second latch; and
transitioning one or more components on the board from the mechanical of state to the reduced power state in response to the change to the first state for the second latch.

23. The method of claim 22 further comprising:
detecting a change from the second state to the first state for the first latch; and
transitioning one or more components on the board from the reduced power state to the working state in response to the change from to the first state for the first latch.

24. An article comprising a computer-readable medium having stored thereon instructions that, when executed, cause one or more processors to:
detect a change from a first state to a second state for a first latch on a board to be used in a modular system;
transition one or more components on the board from a working state to a reduce power state in response to the change to the second state for the first latch;
detect a change from a first state to a second state for a second latch on the board; and
transition one or more components on the board from the reduced power state to a mechanical off state in response to the change to the second state for the second latch.

25. The article of claim 24 further comprising instructions that, when executed, cause the one or more processors to:
detect a change from the second state to the first state for the second latch; and
transition one or more components on the board from the mechanical of state to the reduced power state in response to the change to the first state for the second latch.

26. The article of claim 25 further comprising instructions that, when executed, cause the one or more processors to:
detect a change from the second state to the first state for the first latch; and
transition one or more components on the board from the reduced power state to the working state in response to the change from to the first state for the first latch.

* * * * *